United States Patent
Evans et al.

(10) Patent No.: US 7,499,007 B2
(45) Date of Patent: Mar. 3, 2009

(54) MAXIMIZING EFFICIENCY OF BATTERY-POWERED LED DRIVERS

(75) Inventors: Michael Evans, Los Gatos, CA (US); Adam John Whitworth, Sunnyvale, CA (US)

(73) Assignee: Analog Devices, Inc., Norwood, MA (US)

( * ) Notice: Subject to any disclaimer, the term of this patent is extended or adjusted under 35 U.S.C. 154(b) by 354 days.

(21) Appl. No.: 11/097,663

(22) Filed: Apr. 1, 2005

(65) Prior Publication Data

US 2006/0220570 A1    Oct. 5, 2006

(51) Int. Cl.
G09G 3/32    (2006.01)
G05F 1/10    (2006.01)

(52) U.S. Cl. .......................... 345/82; 345/212; 345/214; 345/211; 345/204; 327/536; 327/538; 327/535; 327/530

(58) Field of Classification Search .................. 345/82, 345/46, 102, 211, 212, 214, 204; 315/224, 315/225, 291, 307–311, 312–326; 327/536, 327/538, 540, 535, 530, 534
See application file for complete search history.

(56) References Cited

U.S. PATENT DOCUMENTS

2002/0047642 A1 *   4/2002   Miyagawa ................... 315/307
2004/0233144 A1 *   11/2004  Rader et al. ................... 345/82

* cited by examiner

Primary Examiner—Tuyet Vo
(74) Attorney, Agent, or Firm—Goodwin Procter LLP

(57) ABSTRACT

An apparatus and method is provided for optimizing LED driver efficiency. The present invention offers low cost solutions for powering LEDs while minimizing overall power dissipation in devices powered by a depletable power source. Low system cost is attained using a charge pump to increase LED drive voltage level and implementing combinations of drive techniques to overcome the inefficiency of the charge pump. A switch bypasses the charge pump when depletable power source output voltage is sufficient to directly drive an LED load. At certain output voltage levels, the switch can be opened causing the charge pump to boost drive voltage. The output voltage may also be PWM modulated to drive the LED load and, at some voltages, the depletable power source may drive the LED load directly. Efficiency levels of 90-97% are attainable.

14 Claims, 5 Drawing Sheets

|  |  | $I_{LED}$ | $V_{BSW}$ | $V_{DR}$ | $V_{LED}$ | $V_{DRIVE}$ |  |  |  |  |  |  |
|---|---|---|---|---|---|---|---|---|---|---|---|---|
| $V_{LED}$ = 3.6V |  | 20mA | 0.07 | 0.1 | 3.6 | 3.77 |  |  |  |  |  |  |
|  |  | 10mA | 0.04 | 0.05 | 3.4 | 3.49 |  |  |  |  |  |  |
|  |  | Charge Pump ON |  |  | 3.6 |  |  |  |  |  |  |  |
|  |  |  |  |  |  |  |  |  |  |  |  |  |
| $V_{BATT}$ | 4.2 | 4.1 | 4 | 3.9 | 3.8 | 3.77 | 3.7 | 3.6 | 3.5 | 3.49 | 3.4 | 3.3 | Mode |
| Efficiency | 85.7% | 87.8% | 90.0% | 92.3% | 94.7% | 95.5% |  |  |  |  |  |  | PWM |
|  |  |  |  |  |  |  | 90.2% | 91.9% | 94.4% | 97.1% | 97.4% |  |  | Linear |
|  |  |  |  |  |  |  |  |  |  |  | 51.6% | 52.9% | 54.5% | Charge Pump |
|  |  | From 4.2V down to 3.5V, average effciency = | | | | 91.8% |  |  |  |  |  |  |
|  |  | From 4.2V down to 3.3V, average effciency = | | | | 84.2% |  |  |  |  |  |  |

|  |  | $I_{LED}$ | $V_{BSW}$ | $V_{DR}$ | $V_{LED}$ | $V_{DRIVE}$ |  |  |  |  |  |  |
|---|---|---|---|---|---|---|---|---|---|---|---|---|
| $V_{LED}$ = 3.5V |  | 20mA | 0.07 | 0.1 | 3.5 | 3.67 |  |  |  |  |  |  |
|  |  | 10mA | 0.04 | 0.05 | 3.3 | 3.39 |  |  |  |  |  |  |
|  |  | Charge Pump ON |  |  | 3.5 |  |  |  |  |  |  |  |
|  |  |  |  |  |  |  |  |  |  |  |  |  |
| $V_{BATT}$ | 4.2 | 4.1 | 4 | 3.9 | 3.8 | 3.7 | 3.67 | 3.6 | 3.5 | 3.4 | 3.39 | 3.3 | Mode |
| Efficiency | 83.3% | 85.4% | 87.5% | 89.7% | 92.1% | 94.6% | 95.4% |  |  |  |  |  | PWM |
|  |  |  |  |  |  |  | 89.9% | 91.7% | 94.3% | 97.1% | 97.3% |  | Linear |
|  |  |  |  |  |  |  |  |  |  |  | 51.6% | 53.0% | Charge Pump |
|  |  | From 4.2V down to 3.4V, average effciency = | | | | 90.6% |  |  |  |  |  |  |
|  |  | From 4.2V down to 3.3V, average effciency = | | | | 86.9% |  |  |  |  |  |  |

Figure 5

MAXIMIZING EFFICIENCY OF BATTERY-POWERED LED DRIVERS

BACKGROUND OF THE INVENTION

1. Field of the Invention

The present invention relates to power management and more particularly to power management circuits in integrated circuits and even more particularly to the management and conservation of battery power.

2. Description of Related Art

Cellular telephones, handheld computers, portable game terminals and other battery-powered devices commonly use Liquid Crystal Display ("LCD") technology to permit users to receive and review text and graphics information. LCD are often backlit, using light emitting diodes ("LEDs") to improve display readability while minimizing power usage. However, LEDs operate only when a sufficient voltage is available and illumination intensities are susceptible to variations in battery voltage levels. To reduce the impact of voltage variation on the illumination intensity, a current source is commonly used to drive LEDs at a selected current level.

A common approach to maintaining illumination levels employs boost regulators (also known as boost switchers) to ensure that LEDs are powered at adequate voltage levels. A drawback of this approach lies in the relatively power efficiencies of boost regulators, which typically operate between 50% and 80% efficiency.

Systems that operate without boost regulators may benefit from greater efficiency when operational, but suffer from limited battery operational time. The operational time of the battery is limited because in these systems, when voltage produced by the battery drops below a level required to turn on the display may become unreadable and the device unusable.

Pulse Width Modulation ("PWM") LED drive methods are frequently used to control intensity of LED output in digital circuitry. PWM controls the intensity of an LED output by pulsing the LED with a variable duty cycle drive voltage such that the LED is turned on while drive voltage is applied and turned off when the voltage is removed. The drive voltage must be switched at sufficiently high frequencies to prevent detection of flicker by the human eye. The duty cycle of the drive voltage also affects the apparent intensity of the light emitted. This apparent intensity may be considered an average intensity over a selected period of time. In a digital circuit the average intensity may be calculated as:

$$L_{AVG} = \left(\frac{t_{on}}{t_{on} + t_{off}}\right) \times L_{MAX},$$

where $t_{on}$ is the duration of time when the voltage is applied to the LED in one cycle and $t_{off}$ is the time the voltage is turned off in one cycle; $L_{AVG}$ is the average luminosity of the LED and $L_{MAX}$ is the maximum luminosity of the LED as observed when voltage is applied to the LED.

Thus, the PWM technique provides a light source of variable intensity where intensity may be controlled by increasing the pulse width of the voltage on time relative to the overall cycle time. PWM provides an alternative method to incrementally increasing or decreasing the level of an unswitched drive voltage. It should be apparent that in order to obtain an apparent intensity equal to a constant voltage driven LED, PWM suffers from the drawback that higher voltages and currents must be used, albeit for relatively short durations. This requirement for higher voltages necessitates the use of a higher voltage battery or the addition of a relatively inefficient voltage booster.

SUMMARY OF THE INVENTION

The present invention offers low cost solutions for powering multiple LEDs while minimizing overall long-term total power dissipation in battery-powered devices such as cellular telephones. Low system cost is attained using a charge pump (CP) that may be implemented to increase available voltage level. The present invention additionally provides methods and apparatus to overcome the inefficiency of charge pumps and enables improved efficiency of battery usage. Efficiency levels of 90-97% are attainable depending on external parameters such as LED voltage and rated battery voltage, and internal parameters such as voltage drops associated with control circuitry.

The present invention incorporates a charge pump, and a switch that bypasses the charge pump when battery output voltage is sufficient to directly drive an LED load. When battery voltage drops below a certain threshold level, the switch is typically opened and the charge pump operates to boost drive voltage. Additionally, other techniques may be combined to improve efficiency. For example, a multi-stage drive system can be implemented in which the battery voltage is initially PWM modulated to drive the LED load, then drives the LED load directly before the battery voltage drops below a threshold at which the charge pump is engaged.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 5 is a table of measured efficiencies achieved by embodiments of the invention.

DETAILED DESCRIPTION OF A PREFERRED EMBODIMENT OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention. Where certain elements of these embodiments can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

For the sake of clarity and to better illustrate various aspects of the invention, exemplary embodiments of the invention include one or more white LEDs ("WLEDs") adapted to provide backlighting for an LCD. In general, references to an LED in this description assume that the LED possesses characteristics (such as operating voltage and current) closely related to the characteristics of a typical WLED. It will be appreciated, however, that in some embodiments of the invention light sources other than WLEDs are used, including colored LEDs and combinations of white and colored LEDs. It will be further appreciated that embodiments of the invention accommodate variations in the specifications of various WLEDs and colored LEDs to incorporate differences in type, structure and form of the implementation.

Further, embodiments of the invention will be described in which charge pumps are employed to increase voltage derived from depletable power sources by a selected proportional amount. Depletable power sources include batteries, fuel cells, solar cells and any suitable storage cells. For the sake of convenience and clarity in the following discussions, a 2× charge pump is used. However, as will be appreciated by one skilled in the art, this 2× charge pump can easily be replaced by a fractional charge pump (such as a 1.5× charge pump) or by an inductor-based boost regulator to provide greater efficiency. Additionally, for the purposes of description only, the example of a battery will be used in the following description as representative of any suitable depletable power source. It will be appreciated that embodiments of the invention can be configured in view of the manner in which output voltage of a particular depletable power source changes with power depletion.

Figure 1:
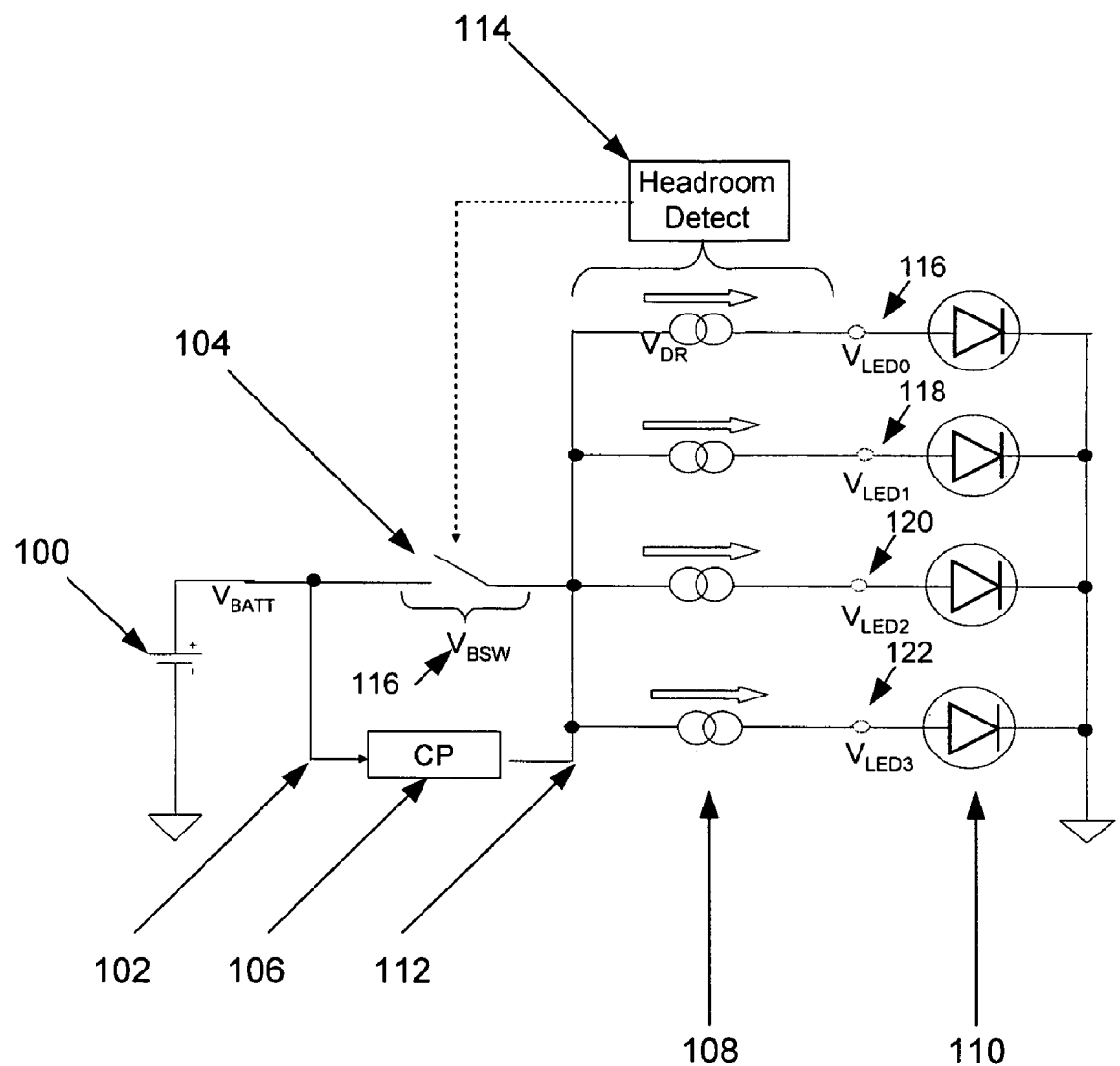
FIG. 1 is a schematic representation of an exemplary embodiment of the invention.

FIG. 1 provides a schematic drawing depicting an example of an apparatus used in embodiments of the invention. The apparatus includes a battery 100, a switch 104, a charge pump 106 and a plurality of LEDs 110, wherein the anode of each LED is connected to the output of one of an associated plurality of current drivers 108. In this example, when the switch 104 is open, the charge pump 106 receives a voltage from the battery 100 and produces a higher output voltage output ("$V_{CPO}$") 112. Assuming that the charge pump doubles the battery voltage when the switch 104 is open, $V_{CPO}$ 112 may be calculated as:

$$V_{CPO} = 2 \times V_{BATT} - V_{CP},$$

where $V_{CP}$ is a voltage drop attributable to the charge pump 106.

When the switch 104 is closed, an electrical bypass of the charge pump 106 occurs, rendering the charge pump 106 inoperative and $V_{CPO}$ 112 may be calculated as:

$$V_{CPO} = V_{BATT} - V_{BSW},$$

where $V_{BSW}$ 116 is a voltage drop attributable to the switch 104.

In the exemplary embodiment, each of the plurality of current drivers 108 drives an associated one of the plurality of LEDs 110. Each current driver typically provides a selected current level to an associated LED 116, 118, 120 and 122. The current is typically selected to provide a desired illumination intensity at a selected operating voltage ("$V_{LED}$") applied to the LED 116, 118, 120 and 122. The operating voltage is selected according to characteristics of the LED 116, 118, 120 and 122. In the example of a WLED, the value of $V_{LED}$ is typically 3.6 Volts. Consequently, each of the plurality of current drivers 108 exhibits a voltage drop (hereinafter "$V_{DR}$") 108 that may be calculated as one of:

$$V_{DR} = 2 \times V_{BATT} - (V_{CP} + V_{LED}), \text{ where the switch 104 is open, and}$$

$$V_{DR} = V_{BATT} - (V_{BSW} + V_{LED}), \text{ where the switch 104 is closed.}$$

Typically, for a selected value of current provided by the current driver, the values of $V_{BSW}$, $V_{LED}$, $V_{CP}$ and other parasitic voltage losses are constant and the variable value of $V_{DR}$ may therefore be used to calculate a voltage level of $V_{BATT}$ regardless of battery state.

Figure 2:
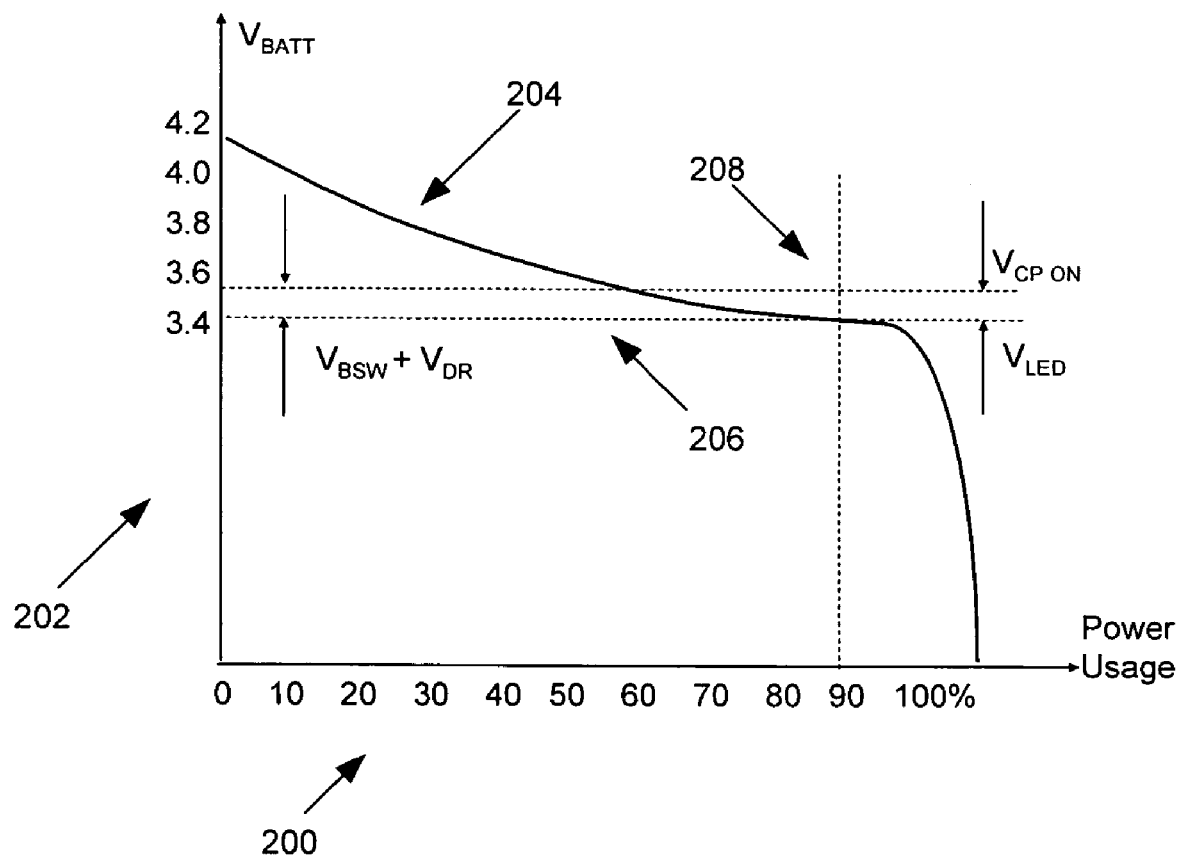
FIG. 2 is a graph depicting typical variation in battery voltage as a battery discharges.

The graph of FIG. 2 shows the relationship between battery voltage 102 and battery charge level 100 and, together with FIG. 1, illustrates the operation of the exemplary embodiment. As shown in the graph generally at 104, battery voltage declines as battery charge dissipates. At a certain point 112, battery voltage 104 crosses a threshold level 108 below which the battery voltage 104 is insufficient to maintain the selected current level. This threshold voltage may be calculated as:

$$V_{THRSH} = V_{LED} + V_{DRMIN} + V_{BSW},$$

where VDRMIN is a minimum current source operating voltage.

In the exemplary embodiment, a headroom detect component 114 monitors the voltage (hereinafter, the "headroom") across each of the plurality of current sources 108 and controls the position of the switch 114 based on detected values of headroom. It will be appreciated that the headroom is representative of the difference in $V_{LED}$ and battery voltage. Typically, when any of the headroom across any of the plurality of current sources 108 drops below a predetermined level, the switch 104 is opened and the charge pump 106 provides a boosted battery voltage to the plurality of current sources 108. By thus controlling the position of the switch 104 as a function of battery output $V_{BATT}$, efficiency of the LED driving circuit can be optimized.

When the charge pump 106 is operational, it will be appreciated that the efficiency ("$eff_{CP}$") of the LED driving circuitry may be approximated as:

$$eff_{CP} = \frac{V_{LED}}{2 \times V_{BATT}}.$$

When the charge pump 106 is bypassed, and the battery is effectively directly connected to the plurality of current drivers 108, the efficiency ("$eff_{DIR}$") of the LED driving circuitry may be approximated as:

$$eff_{DIR} = \frac{V_{LED}}{V_{BATT}}.$$

Therefore, it will be appreciated that the LED driving circuitry efficiency doubles when the charge pump 106 is bypassed. Hence, by enabling the charge pump 106 only when battery voltage falls below a level necessary to operate the plurality of LEDs 110, overall efficiency of the driving circuitry may be optimized.

To better illustrate the operation of the exemplary embodiment, the following example is provided based on the circuit of FIG. 1. In the example, a battery 100 provides a typical maximum voltage of 4.2 V and each of the plurality of LEDs 110 include WLEDs having an operating voltage ($V_{LED}$) of 3.6 V at a selected current level. The efficiency of the LED driving circuit in direct mode at maximum battery voltage may be estimated as:

$$eff_{DIR} = \frac{3.6}{4.2} \times 100\% = 85.7\%.$$

It will be appreciated that $eff_{DIR}$ increases as $V_{BATT}$ decreases toward the threshold level at which the switch 104 opens and the charge pump 106 becomes operational. The efficiency of the LED driving circuit when the charge pump 106 engages may be estimated as:

$$eff_{CP} = \frac{3.6}{2 \times 3.5} \times 100\% = 51.4\%,$$

assuming no voltage loss across the charge pump.

In this example, the voltage drop across the switch 104, $V_{BSW}$, is approximately 70 mV measured at a current of 100 mA. A current of 100 mA is typically sufficient to power at least four LEDs operating in pulse width mode ("PWM"). A headroom voltage ($V_{DR}$) 212 measured across each of the plurality of current drivers 108 is approximately 100 mV measured at a current of 20 mA. Therefore, in the exemplary embodiment where $V_{LED}$ is 3.6 V, the battery can power the plurality of LEDs 110 until $V_{BATT}$ drops to 3.77 V. When $V_{BATT}$ is 3.77V, $eff_{DIR}$ for the current driving circuit may be calculated as 95.5%.

Figure 3:
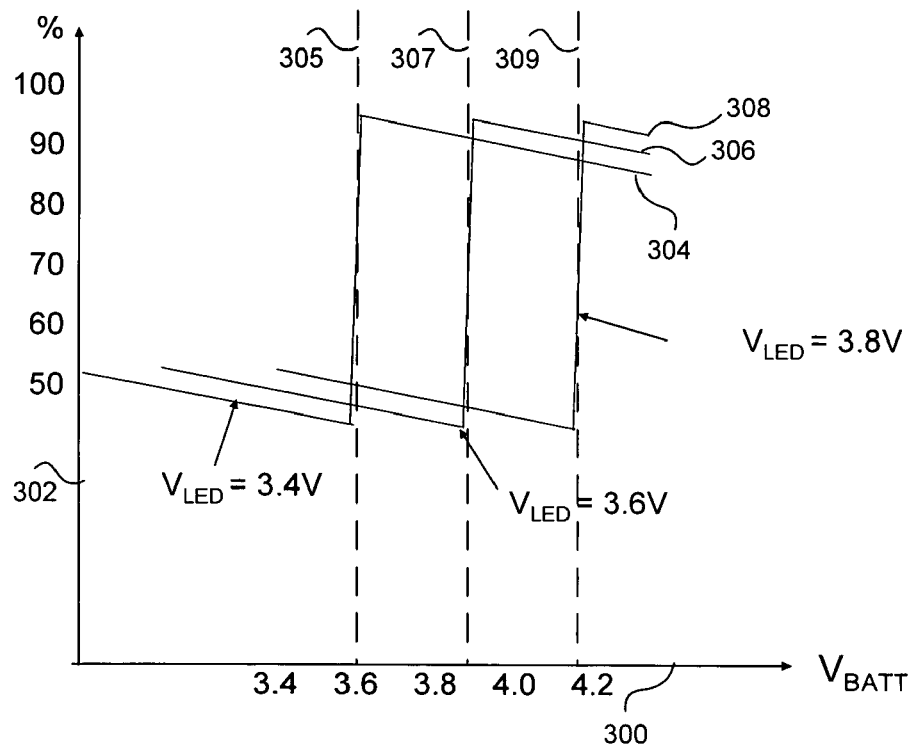
FIG. 3 is a graph plotting LED driver efficiency for three values of LED drive voltage in an exemplary embodiment of the invention.

The graph of FIG. 3 provides efficiency curves 304, 306 and 308 for various operating voltages of the plurality of LEDs 110. It will be appreciated that, at transition voltages 305, 307 and 309 for each curve, it can be observed that efficiencies decrease dramatically as the charge pump 106 engages. It will be appreciated that the area under each curve is a measure of average efficiency of the LED drive circuit and that, consequently, a lower $V_{LED}$ provides greater overall efficiency.

Figure 4:
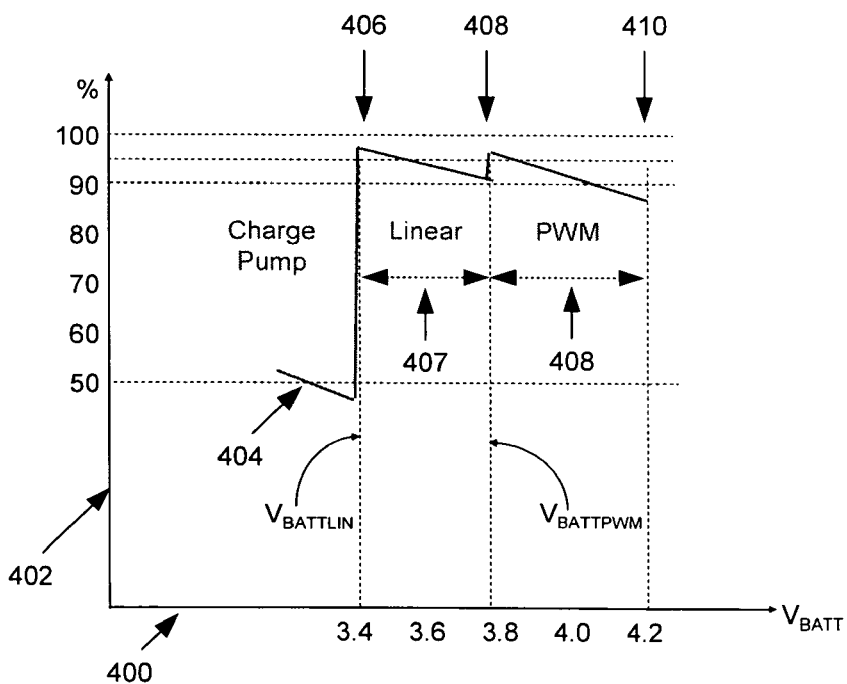
FIG. 4 is a graph showing the efficiency of an LED driving circuit optimized in an embodiment of the invention.

Referring now to FIGS. 1 and 4, in at least some embodiments of the invention, the plurality of current sources may be bypassed in certain voltage ranges to achieve greater efficiencies. In these embodiments, a DC LED driver requires lower drive voltages and currents to achieve a level of luminosity equivalent to the average (perceived) luminosity provided by higher voltage PWM mode drivers. For example, in a typical PWM LED driver with a LED current of 20 mA at 3.6 V where the duty cycle is 50% (i.e. voltage is applied for exactly half of a time period), the resulting apparent luminosity can be matched by applying a lower, constant current of 10 mA at a lower associated voltage of 3.4 V. Further, in this example, the reduction in current results in an associated reduction in the voltage drop of approximately 70 mV across the battery switch 104. In the example, therefore, the battery may be used to directly power the plurality of LEDs 110 until $V_{BATT}$ has dropped to 3.49 V, a value that is only slightly greater than the lowest discharge voltage of a typical battery. This decrease in voltage "losses" permits the battery to power the plurality of LEDs 110 over a greater portion of the battery's operating range without the need for a charge pump 106, resulting in greater overall efficiency. Using the latter example, the maximum efficiency when the LED is driven at 3.4 V may be calculated as:

$$eff_{DIR} = \frac{3.4}{3.49} \times 100\% = 97.4\%.$$

In many embodiments, therefore, PWM mode (shown generally at 409) is used while the battery is sufficiently charged to provide a sufficient level of $V_{BATT}$ without the assistance of the charge pump 106. While battery voltage is insufficient to support PWM mode, but sufficient to directly drive the plurality of LEDs (shown generally at 407), linear mode may be implemented. In linear mode, the battery directly drives the plurality of LEDs 110. In some embodiments, linear mode utilizes the plurality of current sources 108 but in other embodiments, the current sources may be bypassed at some battery voltage levels within the linear mode range 407.

It will be appreciated that, the efficiency ($eff_{LED}$) of the LED drive circuit may be characterized generally as:

$$eff_{LED} \propto \frac{V_{LED}}{V_{BATT}}.$$

Therefore, the use of a higher $V_{LED}$ to drive the plurality of LEDs 110 increases efficiency but may produce higher intensity of illumination than desired. Using a PWM modulated voltage signal with higher $V_{LED}$ levels increases efficiency while effectively maintaining the desired intensity as perceived by the human eye.

Initially, when battery voltage is at a maximum level 410, the plurality of LEDs 110 is driven with a PWM voltage signal. The frequency and duty cycle of the PWM signal are selected to provide a desired effective illumination intensity level. The effective illumination intensity may be understood to be the average intensity level as perceived by a human eye. As the battery 100 discharges and $V_{BATT}$ falls below a level 408 capable of supporting PWM, the drive signal may be changed from PWM mode (shown generally at 409) to linear mode (shown generally at 407). Linear mode 407 provides continuous current at a lower $V_{LED}$ level (for example, at 3.4 V). This transition results in an initial drop in efficiency. Efficiency may subsequently climb as $V_{BATT}$ falls below a minimum linear mode voltage 406. At this point 406, the charge pump 106 may be engaged to provide a voltage of 2× $V_{BATT}$ and efficiency drops accordingly 404.

It will be further appreciated that the use of linear mode 407 reduces the total time during which the inefficient charge pump 106 must be used. Additionally, PWM may also provide significant improvements in efficiency and the combined system serves to improve average efficiency and thus prolong battery operation.

In at least some embodiments, PWM may be also be used to drive the plurality of LEDs 110 while the charge pump operates. However, the use of PWM with a charge pump may require less than a doubling of battery voltage to prevent overdrive of the plurality of LEDs 110. Other arrangements of LEDs and combinations of PWM, linear and charge pump modes are envisaged to optimize battery life in various applications. For example, serially driven LEDs may utilize a combined charge pump and PWM mode.

It will be appreciated that the duty cycle and current used to drive the plurality of LEDs in PWM mode may be incrementally changed as battery voltage decreases. Thus, in at least some embodiments of the invention, efficiency may be further improved by increasing the duty cycle of the voltage signal applied in PWM. Changes in duty cycle affect the duration of voltage application to the plurality of LEDs and simultaneously reduces the value of $V_{LED}$. Efficiency improvements may be obtained because the headroom can be reduced by such adjustments.

FIG. 5 provides a table showing exemplary measurements of efficiencies associated with various battery voltages for $V_{LED}$ values of 3.5 Volts and 3.6 Volts. The table of FIG. 5 permits a calculation of average efficiency observed in embodiments of the invention.

Figure 6:
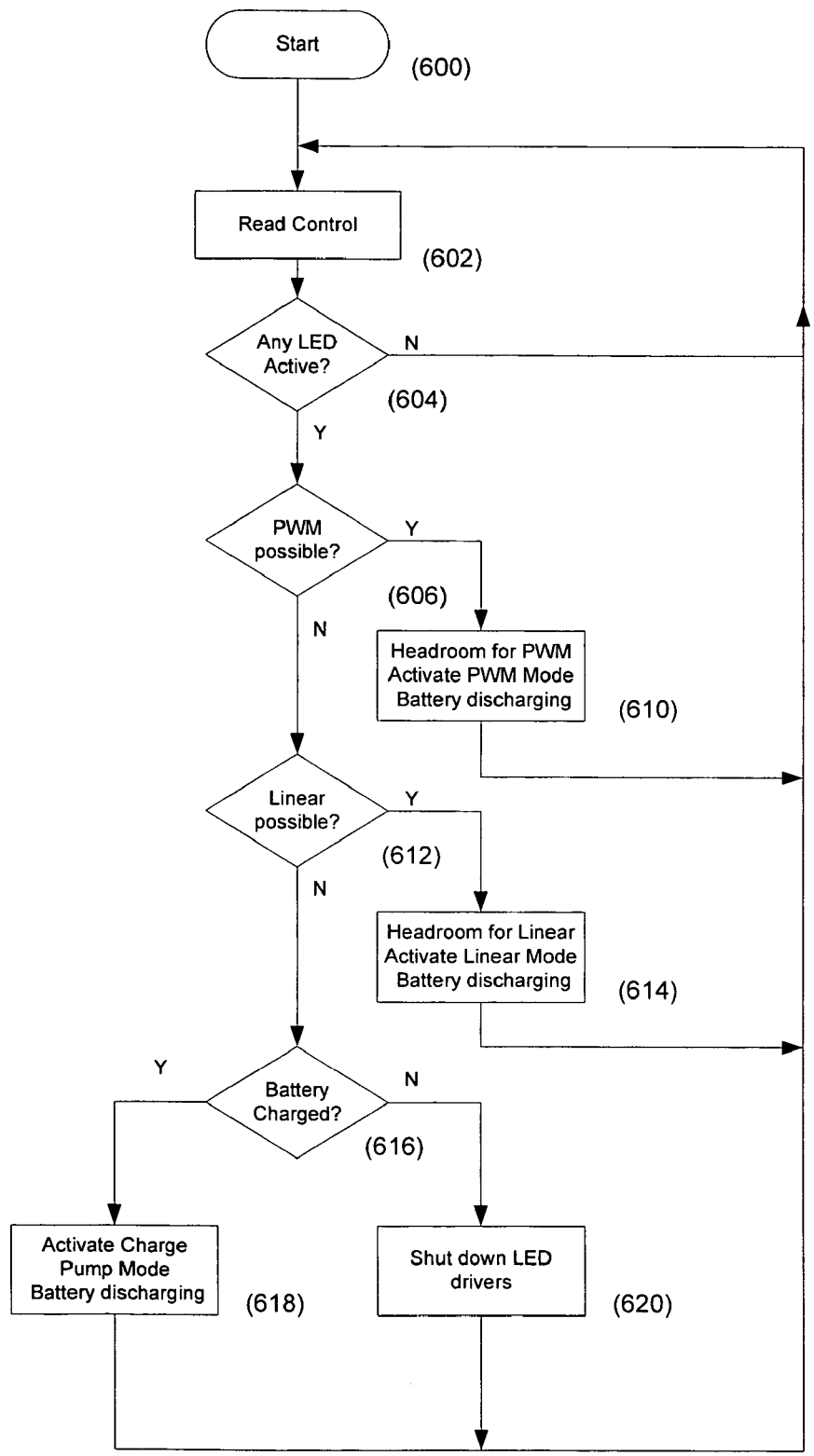
FIG. 6 is a flowchart showing modes of operation of an embodiment of the invention.

Referring now to FIG. 6, a flowchart is provided that describes an example of a control process provided by systems in many embodiments of the invention. It will be appreciated that control may be implemented in a variety of manners including by software algorithm under processor control, by programming registers in a driver device, wherein the registers provide information such as voltage thresholds and enabling flags for LED driving modes. In at least some embodiments, control information is embedded into an LED driving IC to provide predetermined operating characteristics.

After application of power at step 600, the system optionally loads control information at step 602. At step 604, the system checks to see if any LED drivers are active. LED driver activity can be determined from registers, control signal, current levels and voltage levels in the circuit. If no LEDs are active, the process cycles between steps 602 and 604. When at least one LED driver is active, the system compares battery voltage at step 606 to a first threshold indicating that PWM mode is possible. If PWM mode is possible, a PWM driver circuit is enabled or maintained at step 610.

Where PWM cannot be supported or is otherwise disabled by control information, then at step 612, the system compares battery voltage to a second threshold above which linear mode is possible. If sufficient battery voltage is available and linear mode is enabled by control information, then a linear mode driver circuit is enabled or maintained at step 614.

If PWM and linear modes cannot be supported, then at step 616, the system compares battery voltage to a minimum operating voltage. If sufficient voltage is available, then at step 618, a charge pump drive circuit is enabled. If the battery voltage is below minimum operating voltage or charge pump mode is disabled by control information, then all LED driver circuits are disabled at step 620.

Typically, the control process as illustrated cycles through the steps at predetermined intervals. However, in some embodiments, the process is event driven such that, as battery voltage level thresholds are approached or crossed or LED activity changes, information is provided to the control process that causes the control system to take some type of action. For example, in a software controlled system, a threshold event may trigger an interrupt to a processor. Alternatively, a processor or controller may poll flags, or other information that are set when thresholds are crossed or LED activity changes.

It is apparent that the above embodiments may be altered in many ways without departing from the scope of the invention. For example, Further, the invention may be expressed in various aspects of a particular embodiment without regard to other aspects of the same embodiment. Still further, various aspects of different embodiments can be combined together. Accordingly, the scope of the invention should be determined by the following claims and their legal equivalents.

What is claimed is:

1. A method for maximizing LED driver efficiency, the driver being powered by a depletable power source, wherein the method comprises the steps of connecting the depletable power source to an input of a limiting circuit when depletable power source voltage exceeds a first threshold voltage, the limiting circuit having an output coupled to one or more LEDs, and boosting the depletable power source voltage using a current pump when the depletable power source voltage is less than a second threshold voltage;

bypassing the limiting circuit when a drive voltage measured at the input of the limiting circuit is less than a third threshold voltage.

2. The method of claim 1, wherein the depletable power source is a battery.

3. The method of claim 1, wherein the depletable power source is a solar cell.

4. The method of claim 1, wherein the bypassing includes directly coupling the depletable power source to the one or more LEDs while the depletable power source voltage exceeds the second threshold voltage and wherein the third threshold voltage is less than the first threshold voltage.

5. The method of claim 1, wherein the current pump has an input coupled to the depletable power source and an output coupled to the one or more LEDs.

6. The method of claim 1, wherein the current pump has an input coupled to the depletable power source and an output coupled to the input of the limiting circuit.

7. The method of claim 1, wherein the limiting circuit includes at least one current source.

8. The method of claim 1, wherein the limiting circuit includes a modulator and wherein the connecting step includes modulating the depletable power source voltage using pulse width modulation (PWM).

9. A method for maximizing LED driver efficiency, the driver being powered by a depletable power source, wherein the method comprises the steps of connecting the depletable power source to an input of a limiting circuit when depletable power source voltage exceeds a first threshold voltage, the limiting circuit having an output coupled to one or more LEDs, and boosting the depletable power source voltage using a current pump when the depletable power source voltage is less than a second threshold voltage, wherein the limiting circuit includes a modulator for modulating the depletable power source voltage using pulse width modulation (PWM) and at least one current source, and the current source is bypassed when a drive voltage measured at the input of the limiting circuit is less than a third threshold voltage.

10. The method of claim 9, wherein the depletable power source is a battery.

11. The method of claim 9, wherein the depletable power source is a solar cell.

12. The method of claim 9, and further comprising directly coupling the depletable power source to the one or more LEDs while the depletable power source voltage exceeds the second threshold voltage and wherein the third threshold voltage is less than the first threshold voltage.

13. The method of claim 9, wherein the current pump has an input coupled to the depletable power source and an output coupled to the one or more LEDs.

14. The method of claim 9, wherein the current pump has an input coupled to the depletable power source and an output coupled to the input of the limiting circuit.

* * * * *